(12) United States Patent
Attias (10) Patent No.: US 6,957,226 B2
(45) Date of Patent: Oct. 18, 2005

(54) SEARCHING MULTI-MEDIA DATABASES USING MULTI-MEDIA QUERIES

(75) Inventor: Hagai Attias, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 489 days.

(21) Appl. No.: 10/183,794

(22) Filed: Jun. 27, 2002

(65) Prior Publication Data

US 2004/0002935 A1 Jan. 1, 2004

(51) Int. Cl.[7] ............... G06F 17/30; G06F 7/00; G06F 15/00; G06F 15/16; G06K 9/62
(52) U.S. Cl. ............ 707/102; 707/102; 707/104.1; 707/1; 707/3; 715/500; 709/217; 382/224
(58) Field of Search ............... 707/1, 104.1, 102, 707/3; 715/500; 709/217, 107; 382/224

(56) References Cited

U.S. PATENT DOCUMENTS

| | | | |
|---|---|---|---|
| 6,185,309 B1 * | 2/2001 | Attias ............... | 381/94.1 |
| 6,219,640 B1 * | 4/2001 | Basu et al. .......... | 704/246 |
| 6,345,252 B1 | 2/2002 | Beigi et al. .......... | 704/272 |
| 6,404,925 B1 * | 6/2002 | Foote et al. ......... | 382/224 |
| 6,405,166 B1 | 6/2002 | Huang et al. ........ | 704/246 |
| 2003/0033347 A1 * | 2/2003 | Bolle et al. ......... | 709/107 |
| 2003/0048946 A1 * | 3/2003 | Foote et al. ......... | 382/173 |
| 2004/0190732 A1 * | 9/2004 | Acero et al. ........ | 381/94.1 |
| 2004/0205448 A1 * | 10/2004 | Grefenstette ........ | 715/500 |

OTHER PUBLICATIONS

"Features Extraction and Temporal Segmentation of Acoustic Signals"; S. Rossignol, et al.; CNET/RENNES (Centre National d'Etudes des Telecommunications), France.

* cited by examiner

*Primary Examiner*—Mohammad Ali
*Assistant Examiner*—Kuen S. Lu
(74) *Attorney, Agent, or Firm*—Amin & Turocy, LLP (57) ABSTRACT

A system and method for generating responsibility vectors associated with multi-media files (e.g., audio and/or video files) is provided. The responsibility vectors are based upon responsibility of mixture components fitted to a mixture model for frames of the files. The responsibility vectors can be grouped based upon clustering related to extracted identifiable features of frames of the multi-media files. Once generated, responsibility vectors can be searched by a multi-media searching system.

Also provided is a system for multi-media searching based, at least in part upon responsibility vectors associated with a query segment and multi-media files. The system can generate a query profile based, at least in part, upon responsibility vectors of frames of the query segment. The system can further generate segment profiles of segments of the multi-media files. The system can then provide information associated with a likelihood that a particular file of the multi-media files includes the query segment based, at least in part, upon the query profile and a segment profile of the particular file.

28 Claims, 7 Drawing Sheets

SEARCHING MULTI-MEDIA DATABASES USING MULTI-MEDIA QUERIES

TECHNICAL FIELD

The present invention relates generally to searching multi-media databases, and, more particularly to a system and method for searching multi-media databases using multi-media queries.

BACKGROUND OF THE INVENTION

With the vast amount of audio and/or video information available, for example, from the Internet, reliable accessibility to pertinent information has become essential. The amount of information stored within databases can easily overwhelm a user.

Conventional database search techniques utilize keyword searching. The user searches the database with keyword(s), in which a search engine returns relevant information or bits. For example, the hit(s) returned can be sorted according to the frequency of the keyword(s) within the information in the database.

There are difficult and time-consuming steps involved in creating a database utilizing a keyword search. Typically, the information for the database is collected. From this collection of information, a manual-sort is performed. The manual-sort consists of a generalization of the information, which involves a large amount of reading or familiarization of the material (e.g., indexing and/or keyword extraction). This manual-sort categorizes the information into appropriate topic(s) or categories along with the keyword(s) associated with each specific item within the database. Thereafter, the information within the database is searchable according to the keyword(s) associated with the appropriate topic(s) or categories.

Although the keyword search has proven to be an efficient search for databases of textual information, it is inconvenient for multimedia databases. For example, multimedia databases having video and/or audio clips are not readily searchable based on keyword(s) (e.g., because of the lack of or non-existence of written words within the material).

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a multi-media responsibility vector generation system. The system includes a subband extractor, a feature extractor, a feature cluster component and a responsibility vector generator. Optionally, the system can include a multi-media data store and/or a responsibility vector store.

The system can generate responsibility vectors associated with multi-media files (e.g., audio and/or video files). The responsibility vectors are based upon responsibility of mixture components fitted to a mixture model for frames of the files. The responsibility vectors can be grouped, for example, based upon clustering related to extracted identifiable features of frames of the multi-media files. Once generated, responsibility vectors can be searched, for example, by a multi-media searching system to facilitate user searching of the multi-media files associated with the responsibility vectors.

The subband extractor extracts subband signals from frames of files. The files can include audio information and/or video information. Subband signals are obtained, for example, utilizing a Fast Fourier Transform of windowed signals. The feature extractor forms a feature vector for at least some of the frames based, at least in part, upon features extracted from the subband signals. For example, the features can include log-spectra, cepstra and/or temporal derivatives thereof.

The feature cluster component clusters the files based, at least in part, upon vector quantization of the extracted features. The responsibility vector generator generates a responsibility vector for the frames based, at least in part, upon responsibility of mixture components fitted to a mixture model (e.g., Gaussian) for the frame. The optional multi-media data store can store the files. Further, the optional responsibility vector store can store responsibility vectors associated with frame(s) of at least some of the files.

Another aspect of the present invention provides for a multi-media searching system. The system includes a query component, a segment component and a sort component.

The system facilitates searching of multi-media files (e.g., audio and/or video files) based, at least in part upon responsibility vectors associated with a query segment and the multi-media files. The system can generate a query profile based, at least in part, upon responsibility vectors of frames of the query segment. The system can further generate segment profiles of segments of the multi-media files. The system can then provide information associated with a likelihood that a particular file of the multi-media files includes the query segment based, at least in part, upon the query profile and a segment profile of the particular file.

The query component calculates responsibility vectors for frames of a query segment. The query segment can be, for example, a segment of audio (e.g., song or particular voice) and/or video information (e.g., image) that a user desires to find within the multi-media files. The query component provides a query profile based, at least in part, upon the responsibility vectors of the frames of the query segment.

In order to generate the responsibility vectors of the frames of the query segment, the query component can first extract subband signals. The query component can then generate responsibility vectors for frames based, at least in part, upon responsibility of mixture components fitted to a mixture model (e.g, Gaussian) for the frame.

The segment oomponent retrieves responsibility vectors for segments of files and generates segment profiles of segments of the files. A segment profile for a segment can be based, at least in part, upon responsibiity vectors of the segment.

The sort component provides information associated with a likelihood that a particular file includes the query segment based, at least in part, upon the query profile and a segment profile of a segment of the particular file. The likelihood can be, for example, a probability that a particular file includes the query segment.

In one implementation, the sort component calculates a Kullback-Leibler (KL) distance between the query profile and the segment profile. For example, the sort component can calculate a KL distance between the query profile and each of a plurality of segment profiles. The sort component can then sort the files according to its associated segment KL distance of its associated segment profile.

Yet another aspect of the present invention provides for a multi-media searching system having a query component, a segment component and a sort component. The system further includes a display component, a responsibility vector store and/or a multi-media data store.

The display component can display information (e.g., to a user) received from the sort component, for example, information associated with a likelihood that a particular file includes a query segment based, at least in part, upon a query profile and a segment profile of a segment of the particular file. Additionally and/or alternatively, the display component can display a likelihood that a plurality of files include the query segment. Information displayed via the display component can be sorted by sorting component.

The display component can further facilitate a user's selection of a file. For example, in the instance in which the display component displays information associated with a plurality of files, the user can select one or more of the plurality of files (e.g., to listen to and/or to view).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Figure 1:
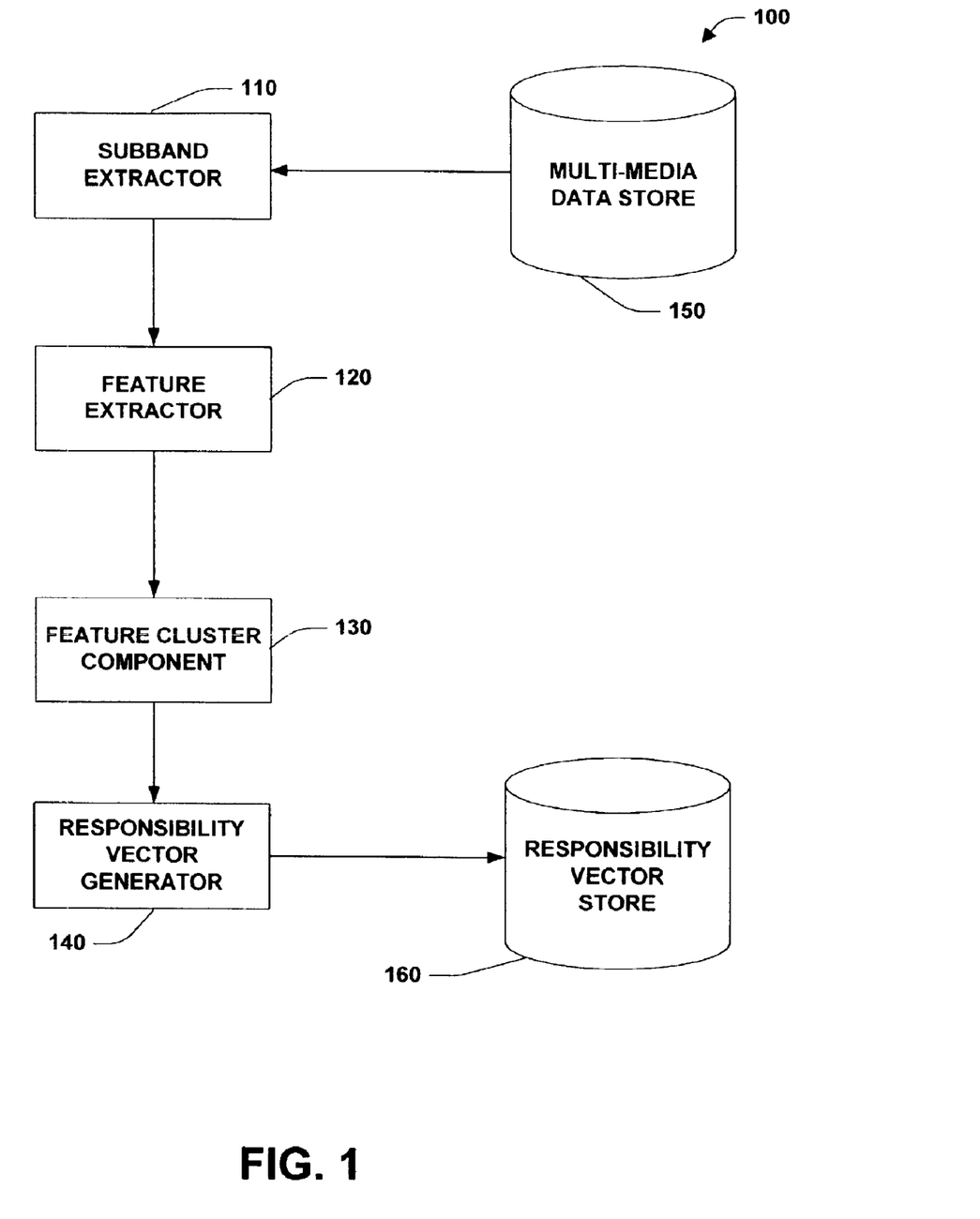
FIG. 1 is a block diagram of a multi-media responsibility vector generation system in accordance with an aspect of the present invention.

Referring to FIG. 1, a multi-media responsibility vector generation system 100 in accordance with an aspect of the present invention is illustrated. The system 100 includes a subband extractor 110, a feature extractor 120, a feature cluster component 130 and a responsibility vector generator 140. Optionally, the system 100 can include a multi-media data store 150 and/or a responsibility vector store 160.

The system 100 can generate responsibility vectors associated with multi-media files (e.g., audio and/or video files). The responsibility vectors are based upon responsibility of mixture components fitted to a mixture model for frames of the files. The responsibility vectors can be grouped, for example, based upon clustering related to extracted identifiable features of frames of the multi-media files. Once generated, responsibility vectors can be searched, for example, by a multi-media searching system (not shown) to facilitate user searching of the multi-media files associated with the responsibility vectors.

The subband extractor 110 extracts subband signals from frames of files. The files can include audio information and/or video information. Subband signals are obtained by applying an N-point window to frames of the files, at substantially equally spaced points and computing a frequency transform of the windowed signal. An appropriate quantity of subbands can be utilized. For purposes of discussion with regard to the present invention, a Fast Fourier Transform (FFT) of the windowed signal will be used; however, it is to be appreciated that any type of frequency transform suitable for carrying out the present invention can be employed and all such types of frequency transforms are intended to fall within the scope of the hereto appended claims.

The feature extractor 120 forms a feature vector for at least some of the frames based, at least in part, upon features extracted from the subband signals. For example, the features can include log-spectra, cepstra and/or temporal derivatives thereof.

The feature cluster component 130 clusters the files based, at least in part, upon vector quantization of the extracted features.

The responsibility vector generator 140 generates a responsibility vector for the frames based, at least in part, upon responsibility of mixture components fitted to a mixture model for the frame. For purposes of discussion, a Gaussian mixture model will be used; however, it is to be appreciated that any type of mixture model (e.g., with component(s) having arbitrary and/or exponential distribution(s)) suitable for carrying out the present invention can be employed and all such types of mixture models are intended to fall within the scope of the hereto appended claims. For example, a hidden Markov model (HMM) can be employed in accordance with an aspect of the present invention.

In one implementation, the mixture model is Gaussian. The model has S components labeled s=1 ..., S. Denoting the data of the nth frame by $x_n$, the model is defined by:

$$p(x_n) = \sum_{s=1}^{S} p(x_n | s_n = s) p(s_n = s) \qquad (1)$$

where $p(x_n|s_n=s)$ is Gaussian with mean $\mu_s$ and precision matrix $v_s$ (e.g., $p(x_n|s_n=s)=\mathcal{N}(x_n|\mu_s, v_s)$) and $p(s_n=s)=\pi_s$ are usually termed mixing proportions.

The responsibility of component s of frame n is denoted $\gamma_{sn}$ and given by:

$$\gamma_{sn} = p(s_n = s | x_n) = \frac{p(x_n | s_n = s) p(s_n = s)}{\sum_{s'} p(x_n | s_n = s') p(s_n = s')} \qquad (2)$$

where $\gamma_{sn} \geq 0$ and $\Sigma_s \gamma_{sn}=1$ for each frame n. The responsibility of each component s form a responsibility vector for a frame n. In one implementation, the responsibility vector generator 140 generates a responsibility vector for substantially all frames of each of the files.

The optional multi-media data store 150 can store the files. Further, the optional responsibility vector store 160 can store responsibility vectors associated with frame(s) of at least some of the files.

The system 100 has been described employing a mixture model for the files; however, it is to be appreciated that several datasets (e.g., groups of files) can be combined into a training set and single mixture model trained on the combined training set.

While FIG. 1 is a block diagram illustrating components for the system 100, it is to be appreciated that the subband extractor 110, the feature extractor 120, the feature cluster component 130 and/or the responsibility vector generator 140 can be implemented as one or more computer components, as that term is defined herein. Thus, it is to be appreciated that computer executable components operable to implement the subband extractor 110, the feature extractor 120, the feature cluster component 130 and/or the responsibility vector generator 140 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 2:
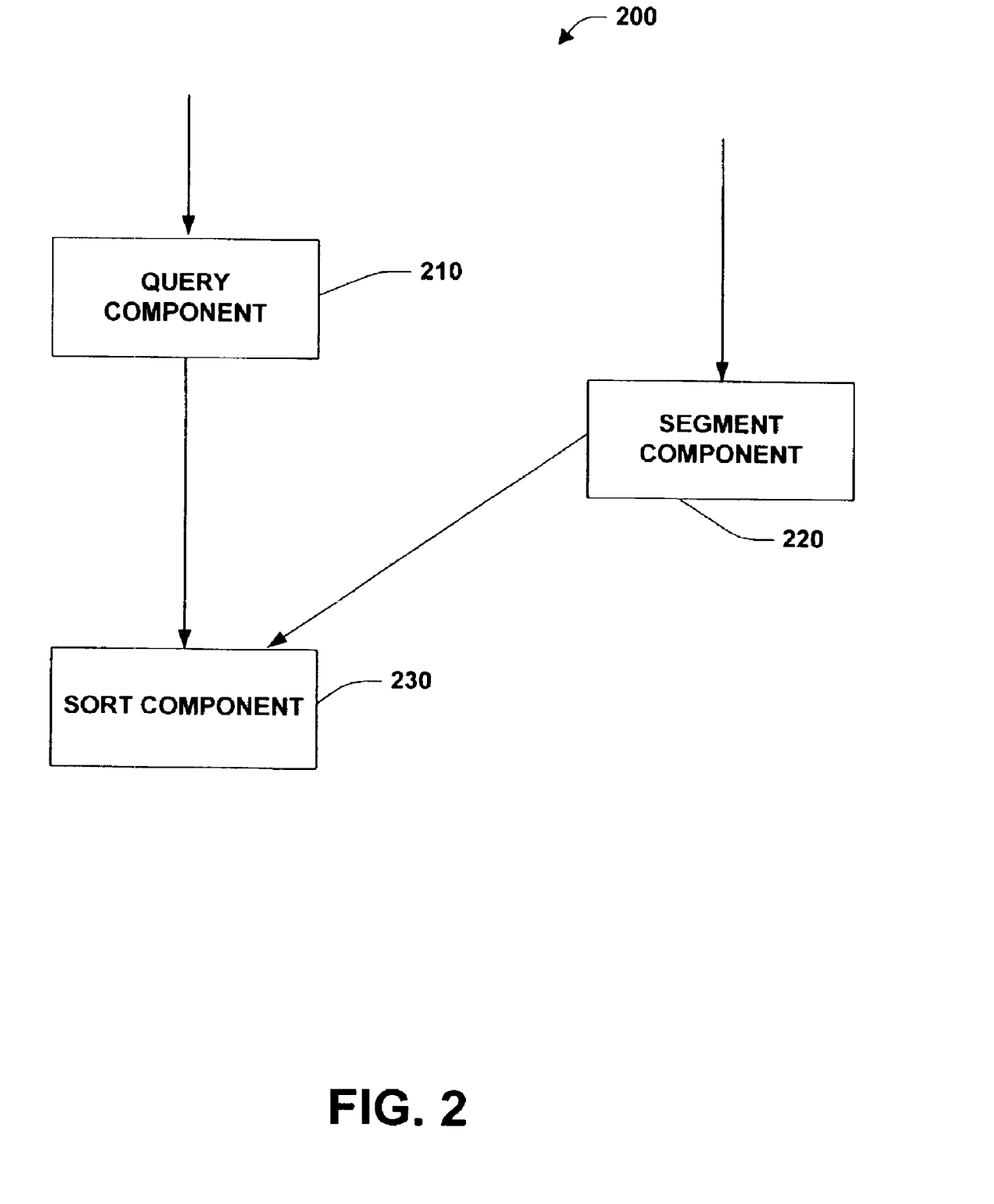
FIG. 2 is a block diagram of a multi-media searching system in accordance with an aspect of the present invention.

Turning next to FIG. 2, a multi-media searching system 200 in accordance with an aspect of the present invention is illustrated. The system 200 includes a query component 210, a segment component 220 and a sort component 230.

The system 200 facilitates searching of multi-media files (e.g., audio and/or video files) based, at least in part upon responsibility vectors associated with a query segment and the multi-media files. The system can generate a query profile based, at least in part, upon responsibility vectors of frames of the query segment. The system can further generate segment profiles of segments of the multi-media files. The system can then provide information associated with a likelihood that a particular file of the multi-media files includes the query segment based, at least in part, upon the query profile and a segment profile of the particular file.

The query component 210 calculates responsibility vectors for frames of a query segment. The query segment can be, for example, a segment of audio (e.g., song or particular voice) and/or video information (e.g., image) that a user desires to find within the multi-media files. The query component 210 provides a query profile based, at least in part, upon the responsibility vectors of the frames of the query segment.

In order to generate the responsibility vectors of the frames of the query segment, the query component 210 first extracts subband signals as discussed supra. The query component 210 then generates responsibility vectors for frames based, at least in part, upon responsibility of mixture components fitted to a mixture model (e.g., Gaussian) for the frame using equations (1) and (2).

Considering a query segment having M consecutive frames, for each frame m=1, ..., M, there is an associated responsibility vector $\gamma_{sm}$. The query profile, denoted $q_s$, s=1, ..., S, is given by:

$$q_s = \frac{1}{M} \sum_{m=1}^{M} \gamma_{sm} \qquad (3)$$

which satisfies the constraint that $q_s \geq 0$ and $\Sigma_s q_s=1$. In one implementation, the query profile is approximated by a single component (e.g., that has the highest probability).

The segment component 220 retrieves responsibility vectors for segments of files and generates segment profiles of segments of the files. A segment profile for a segment can be based, at least in part, upon responsibility vectors of the segment:

$$r_s = \frac{1}{M'} \sum_{m=1}^{M'} \gamma_{sm} \qquad (4)$$

for a profile segment having M' consecutive frames, and, for each frame m=1, ..., M', an associated responsibility vector $\gamma_{sm}$. In one implementation, the segment profiles are approximated by a single component (e.g., that has the highest probability).

The sort component 230 provides information associated with a likelihood that a particular file includes the query segment based, at least in part, upon the query profile and a segment profile of a segment of the particular file. The likelihood can be, for example, a probability that a particular file includes the query segment.

In one implementation, the sort component 230 calculates a Kullback-Leibler (KL) distance between the query profile and the segment profile. The KL distance D(r,q) from segment profile $r_s$ to query profile $q_s$ is given by:

$$D(r, q) = \sum_{s=1}^{S} r_s \log \frac{r_s}{q_s} \qquad (5)$$

where D is non-negative, but not necessarily symmetric.

For example, the sort component 230 can calculate a KL distance between the query profile $q_s$ and each of a plurality of segment profiles $r_s$. The sort component 230 can then sort the files according to its associated segment KL distance of its associated segment profile $r_s$.

It is to be appreciated that the query component 210, the segment component 220 and/or the sort component 230 can be computer components as that term is defined herein.

Figure 3:
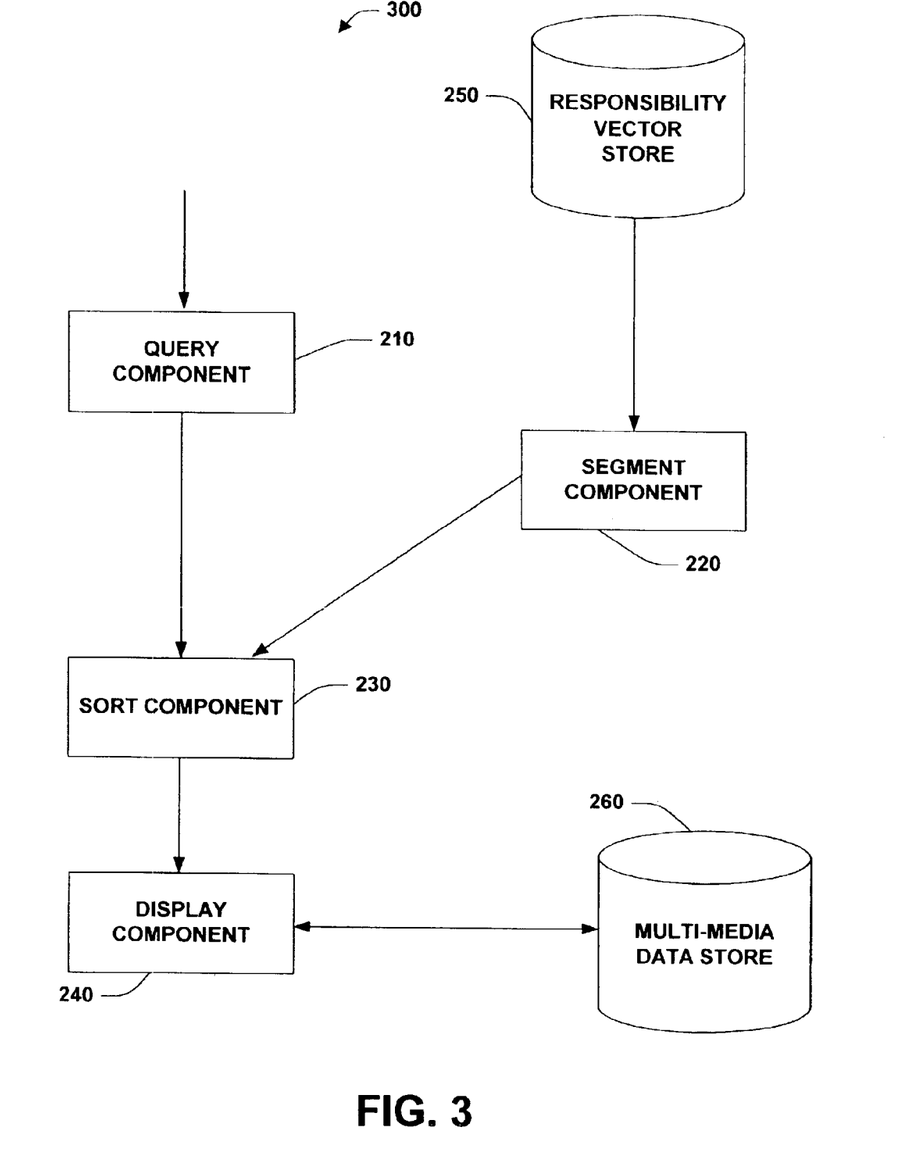
FIG. 3 is a block diagram of a multi-media searching system in accordance with an aspect of the present invention.

Referring next to FIG. 3, a multi-media searching system 300 in accordance with an aspect of the present invention is illustrated. The system 300 includes a query component 210, a segment component 220 and a sort component 230. The system 300 further includes a display component 240, a responsibility vector store 250 and/or a multi-media data store 260.

The display component 240 can display information (e.g., to a user) received from the sort component 230, for example, information associated with a likelihood that a particular file includes a query segment based, at least in part, upon a query profile and a segment profile of a segment of the particular file. Additionally and/or alternatively, the display component 240 can display a likelihood that a plurality of files include the query segment. Information displayed via the display component 240 can be sorted by sorting component 230.

The display component 240 can further facilitate a user's selection of a file. For example, in the instance in which the display component 240 displays information associated with a plurality of files, the user can select one or more of the plurality of files (e.g., to listen to and/or to view).

The system 300 can be extended to utilize Bayesian learning from user(s) of the system 300 by incorporating feedback from user(s). The posterior probability that a given segment is the target of a user's search is computed, conditioned on the query segment. The computation involves specifying (1) a prior distribution on the segment, which can be assumed uniform, and, (2) the probability that the user generated the query conditioned on that segment being their target. The probability can be defined as the exponential of the KL distance between the query and segment (e.g., modified by a term determining the variance of that probability).

Having defined the probabilistic model, the model can be extended to also describe the user's actions. For example, the user may rank files resulting from the search, and the ranking may itself become data and be modeled by the model. The model would be able to attempt predicting the user's actions, and modifying the search results to maximize positive feedback from the user.

Figure 4:
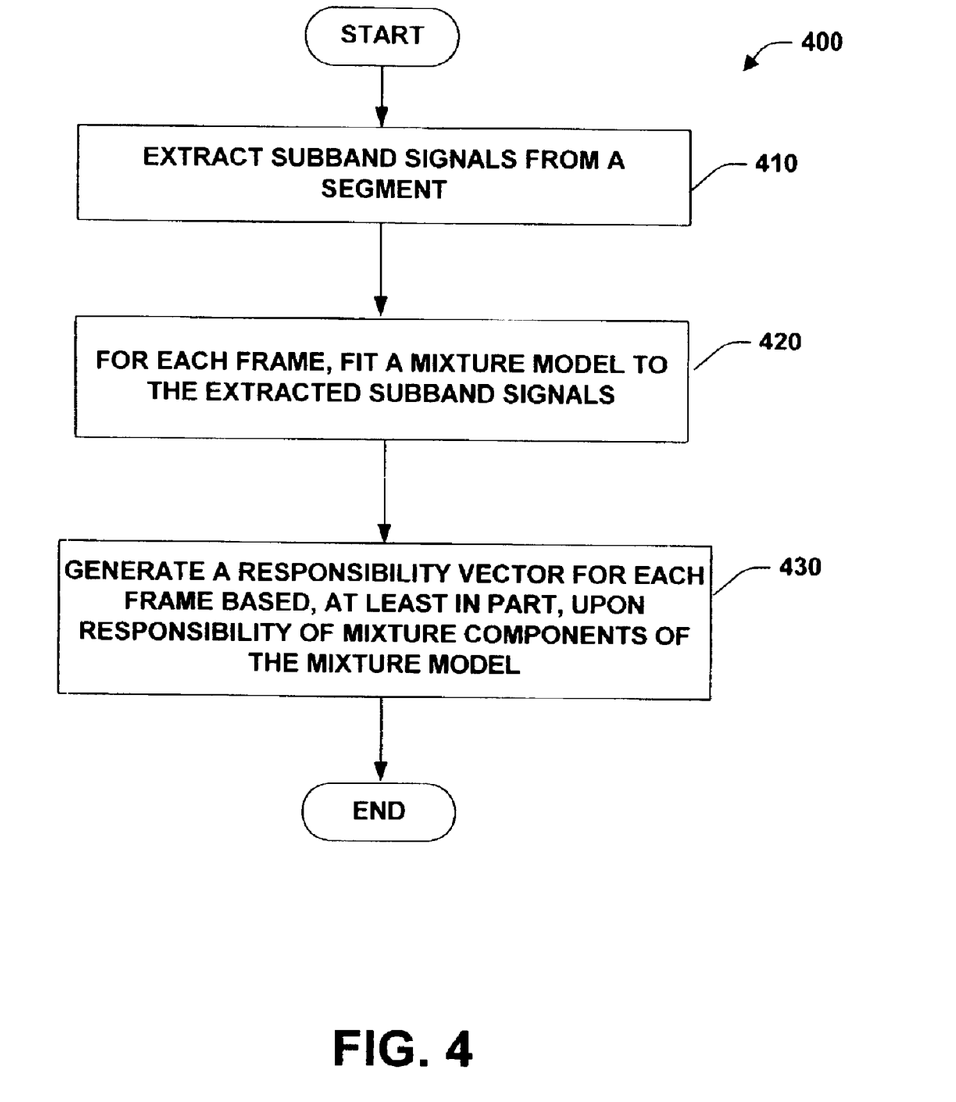
FIG. 4 is a flow chart illustrating a method for generating a responsibility vector in accordance with an aspect of the present invention.
Figure 5:
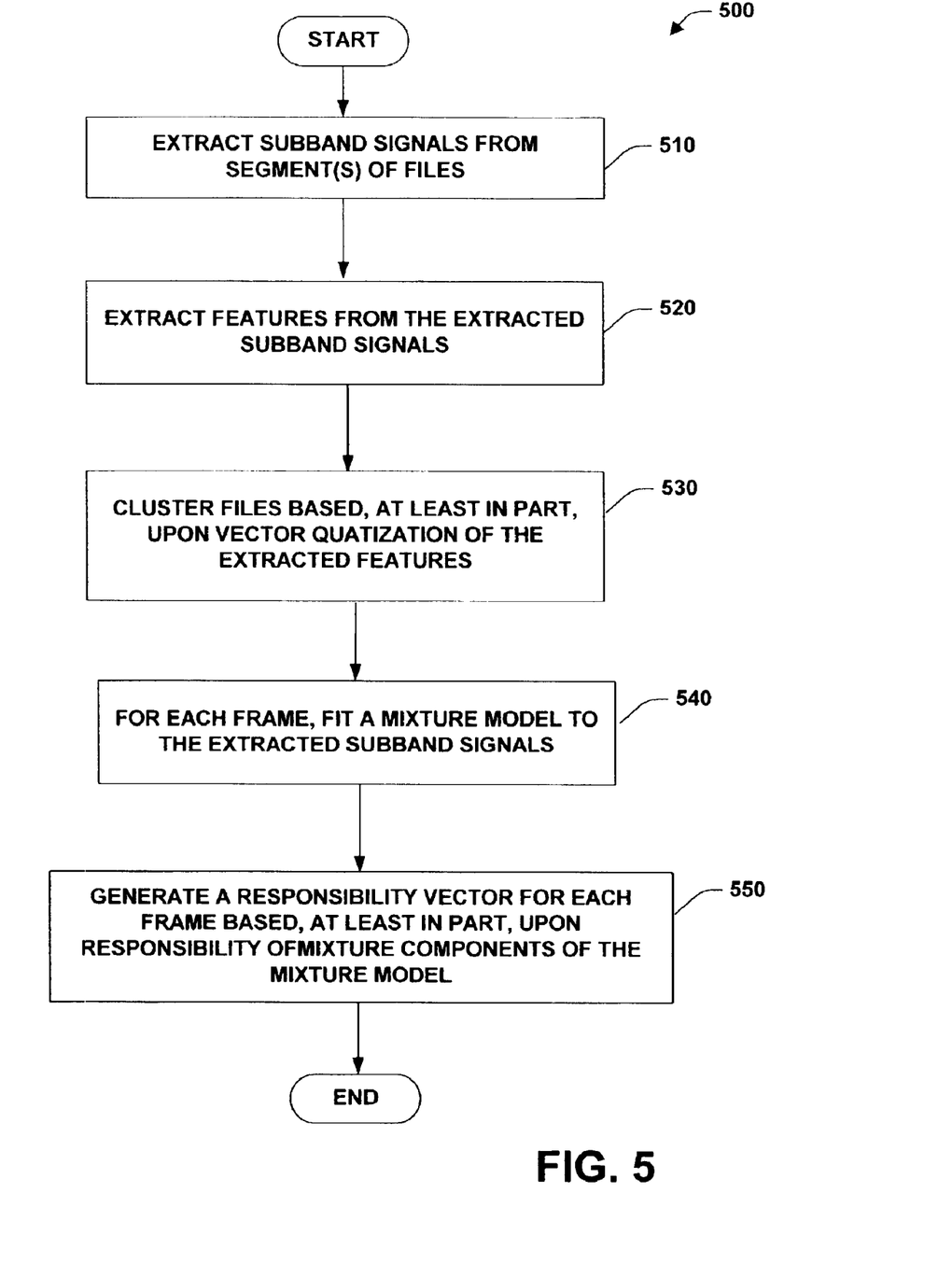
FIG. 5 is a flow chart illustrating a method for storing responsibility vectors in accordance with an aspect of the present invention.
Figure 6:
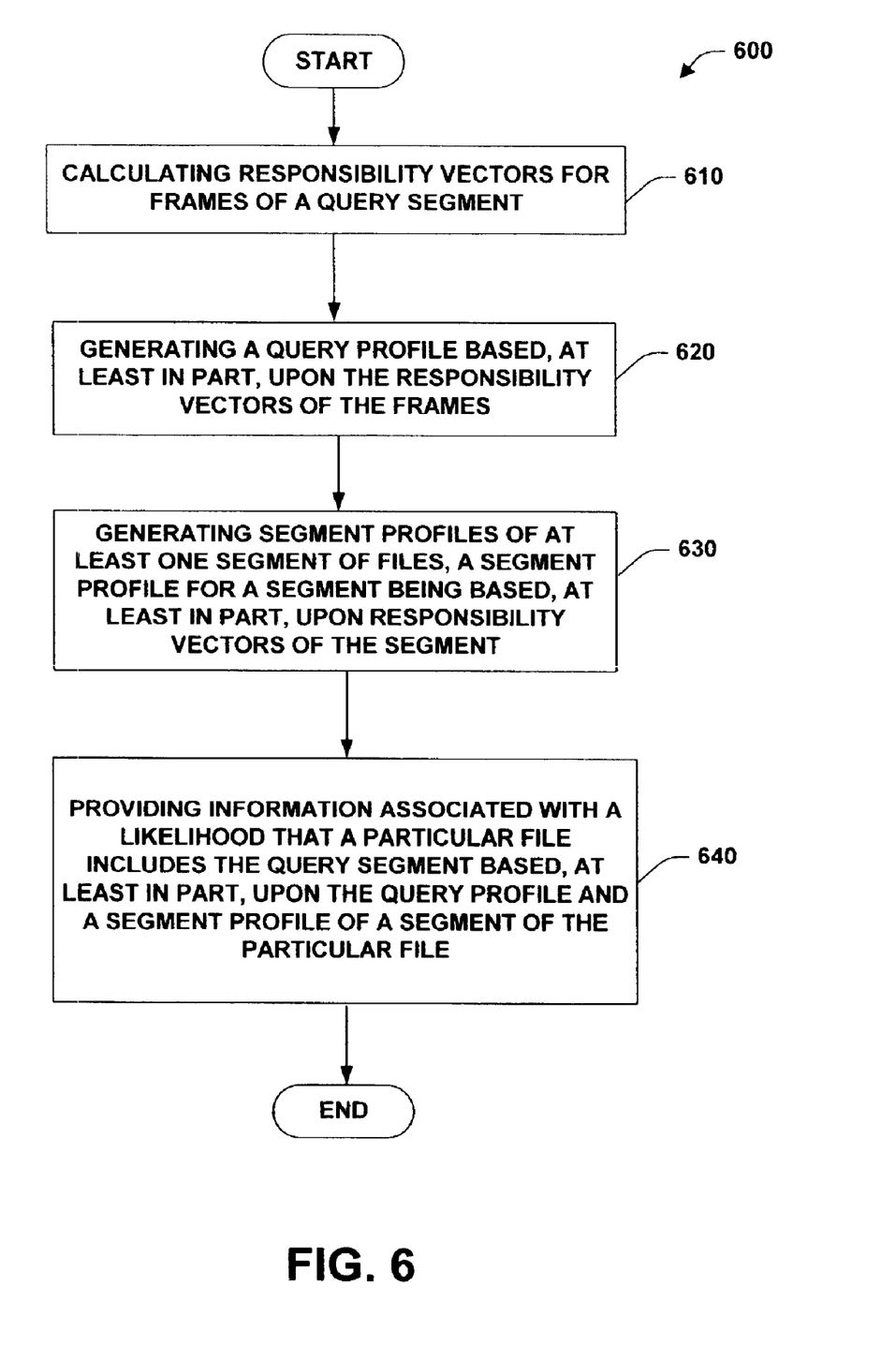
FIG. 6 is a flow chart illustrating a method for searching a multi-media database in accordance with an aspect of the present invention.

In view of the exemplary systems shown and described above, methodologies that may be implemented in accordance with the present invention will be better appreciated with reference to the flow charts of FIGS. 4, 5 and 6. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Turning to FIG. 4, a method 400 for generating a responsibility vector in accordance with an aspect of the present invention is illustrated. At 410, subband signals are extracted from a segment. At 420, a mixture model (e.g., Gaussian) is fitted to the subband signals for each frame. At 430, a responsibility vector is generated for each frame based, at least in part, upon responsibility of mixture components of the mixture model.

Next, referring to FIG. 5, a method 500 for storing responsibility vectors in accordance with an aspect of the present invention is illustrated. At 510, subband signals are extracted from segment(s) of files. At 520, features are extracted from the extracted subband signals (e.g., forming feature vectors). At 530, the files are clustered based, at least in part, upon vector quantization of the extracted features.

At 540, a mixture model (e.g., Gaussian) is fitted to the extracted subband signals for each frame. At 550, a responsibility vector is generated for each frame based, at least in part, upon responsibility of mixture components of the mixture model.

Referring to FIG. 6, a method 600 for searching a multimedia database in accordance with an aspect of the present invention is illustrated. At 610, responsibility vectors for frames of a query segment are calculated. For example, subband signals can be extracted from frames of the query segment, and, a mixture model fitted to the extracted subband signals, for each frame. At 620, a query profile is generated based, at least in part, upon the responsibility vectors of the frames (e.g., based on Eq. (3)).

At 630, segment profiles of at least one segment of each file being searched are generated, the segment profile for a segment being based, at least in part, upon responsibility vectors of the segment (e.g., based on Eq. (4)). At 640, information associated with a likelihood that a particular file includes the query segment based, at least in part, upon the query profile and a segment profile of a segment of the particular file is provided. For example, the information provided can be based upon a Kullback-Leibler distance calculated between the query profile and the segment profiles (e.g., based on Eq. 5) which is used to sort the segment profiles based, at least in part, upon the segment profile's similarity to the query profile.

Figure 7:
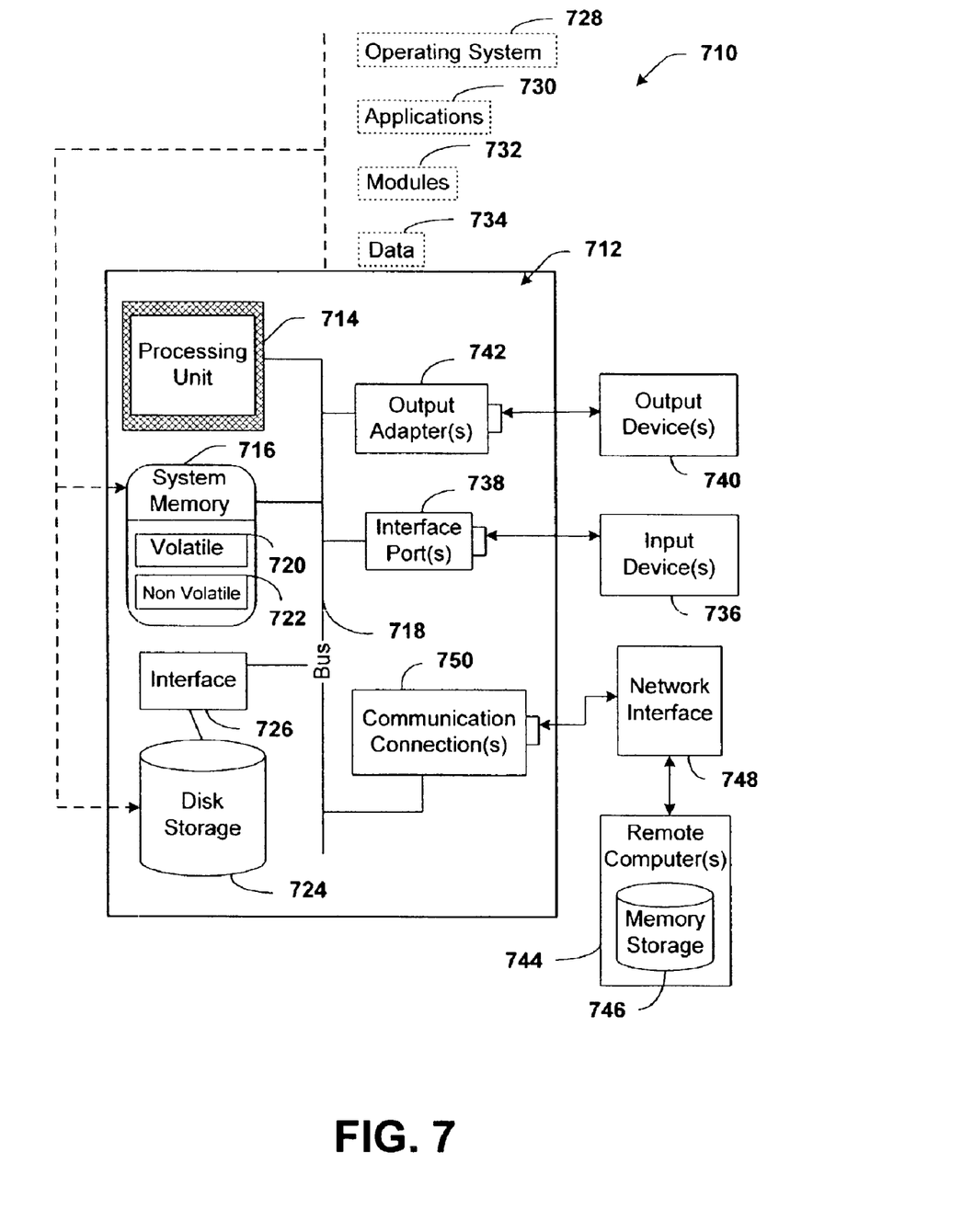
FIG. 7 illustrates an example operating environment in which the present invention may function.

In order to provide additional context for various aspects of the present invention, FIG. 7 and the following discussion are intended to provide a brief, general description of a suitable operating environment 710 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 710 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 710 for implementing various aspects of the invention includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, 7-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the present invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 702.3, Token Ring/IEEE 702.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented multi-media responsibility vector generation system, comprising:
   a subband extractor that extracts subband signals from frames of files, the files comprising at least one of audio information and video information;
   a feature extractor that forms a feature vector for at least some of the frames based, at least in part, upon features extracted from the subband signals;
   a feature cluster component that clusters the files based, at least in part, upon vector quantization of the extracted features; and, a responsibility vector generator that generates a responsibility vector for at least some of the frames based, at least in part, upon responsibility of mixture components fitted to a mixture model for the frame.

2. The system of claim 1, at least one mixture component of the mixture model being Gaussian.

3. The system of claim 2, the mixture model being based, at least in part, upon the following equation:

$$p(x_n) = \sum_{s=1}^{S} p(x_n | s_n = s) p(s_n = s)$$

where $x_n$ is data of an nth frame,
S is a quantity of components of the mixture model,
$p(x_n|s_n=s)$ is a component of the mixture model, and,
$p(s_n=s)$ are mixing proportions.

4. The system of claim 3, the responsibility vectors being based, at least in part, upon the following equation:

$$\gamma_{sn} = p(s_n = s | x_n) = \frac{p(x_n | s_n = s) p(s_n = s)}{\sum_{s'} p(x_n | s_n = s') p(s_n = s')}$$

where $\gamma_{sn}$ is the responsibility of component s of frame n.

5. The system of claim 1, the extracted features including at least one of log-spectra, cepstra, temporal derivatives of log-spectra and temporal derivates of cepstra.

6. The system of claim 1, further composing a multi-media data store that stores at least some of the files.

7. The system of claim 1, further comprising a responsibility vector store that stores responsibility vectors associated with frames of at least some of the files.

8. A computer-implemented multi-media searching system, comprising:
a query component that calculates responsibility vectors for frames of a multi-media query segment, the multi-media query component providing a query profile based, at least in part, upon the responsibility vectors of the frames;
a segment component that retrieves responsibility vectors for segments of multi-media files, the segment component generating segment profiles of at least one segment of the multi-media files, a segment profile for a segment being based, at least in part, upon responsibility vectors of the segment; and,
a sort component that provides information associated with a likelihood that a particular multi-media file includes the multi-media query segment based, at least in part, upon the query profile and a segment profile of a segment of the particular multi-media file.

9. The system of claim 8, the query profile being based upon an average of the responsibility vectors over the frames of the query segment.

10. The system of claim 8, the segment profile being based upon an average of the responsibility vectors over the frames of the segment.

11. The system of claim 8, the query component further extracting subband signals from frames of the query segment.

12. The system of claim 11, calculation of the responsibility vectors being based, at least in part, upon responsibility of mixture components fitted to a mixture model for the frames of the query segment.

13. The system of claim 12, at least one mixture component of the mixture model being Gaussian.

14. The system of claim 13, the mixture model being based, at least in part, upon the following equation:

$$p(x_n) = \sum_{s=1}^{S} p(x_n | s_n = s) p(s_n = s)$$

where $x_n$ is data of an nth frame of the query segment,
S is a quantity of components of the mixture model,
$p(x_n|s_n=s)$ is a component of the mixture model, and,
$p(s_n=s)$ are mixing proportions.

15. The system of claim 13, the responsibility vectors of the query segment being based, at least in part, upon the following equation:

$$\gamma_{sn} = p(s_n = s | x_n) = \frac{p(x_n | s_n = s) p(s_n = s)}{\sum_{s'} p(x_n | s_n = s') p(s_n = s')}$$

where $\gamma_{sn}$ is the responsibility of component s of frame n.

16. The system of claim 8, further comprising a display component that displays information associated with a likelihood that a particular file includes the query segment received from the sort component.

17. The system of claim 8, further comprising a responsibility vector store that stores responsibility vectors associated with frames of at least some of the files.

18. The system of claim 8, further comprising a multi-media data store that a multi-media data store that stores at least some of the files.

19. The system of claim 8, the sorting component further calculating a Kullback-Leibler distance between the query profile and at least some of the segment profiles, the sorting component further using the Kullback-Leibler distances to sort the segment profiles based, at least in part, upon the segment profile's similarity to the query profile.

20. The system of claim 19, calculation of the Kullback-Leibler distance being based, at least in part, upon the following equation:

$$D(r, q) = \sum_{s=1}^{S} r_s \log \frac{r_s}{q_s}$$

where $r_s$ is a particular segment profile,
$q_s$ is the query profile,
S is a quantity of segment profiles, and,
$D(r,q))$ is the Kullback-Leibler distance.

21. A computer-implemented method for storing responsibility vectors, comprising:
extracting subband signals from frames of segments of files;
extracting features from the extracted subband signals;
clustering files based, at least in part, upon vector quantization of the extracted features;
fitting a mixture model to the extracted subband signals, for each frame; and,
generating a responsibility vector for each frame based, at least in part, upon responsibility of mixture components of the mixture model.

22. A computer-implemented method for searching a multi-media database, comprising:
calculating responsibility vectors for frames of a multi-media query segment; generating a query profile based, at least in part, upon the responsibility vectors of the frames;

generating segment profiles of at least one segment of multi-media files, a segment profile for a segment being based, at least in part, upon responsibility vectors of the segment; and, providing information associated with a likelihood that a particular multi-media file includes the multi-media query segment based, at least in part, upon the query profile and a segment profile of a segment of the particular multi-media file.

23. The method of claim 22, calculating responsibility vectors for frames of the query segment comprising at least one of the following acts:

extracting subband signals from frames of the query segment; and, fitting a mixture model to the extracted subband signals, for each frame.

24. The method of claim 22, providing information further comprising:

calculating a Kullback-Leibler distance between the query profile and at least some of the segment profiles; and, using the Kullback-Leibler distances to sort the segment profiles based, at least in part, upon the segment profile's similarity to the query profile.

25. A computer readable medium storing computer executable components of a multi-media responsibility vector generation system, comprising:

a subband extractor component that extracts subband signals from frames of files, the files comprising at least one of audio information and video information;

a feature extractor component that forms a feature vector for at least some of the frames based, at least in part, upon features extracted from the subband signals;

a feature cluster component that clusters the files based, at least in pan, upon vector quantization of the extracted features; and, a responsibility vector generator component that generates a responsibility vector for at least some of the frames based, at least in part, upon responsibility of mixture components fitted to a mixture model for the frame.

26. A computer readable medium storing computer executable components of a multi-media searching system, comprising:

a query component that calculates responsibility vectors for frames of a multi-media query segment, the query component providing a query profile based, at least in part, upon the responsibility vectors of the frames;

a segment component that retrieves responsibility vectors for segments of multi-media files, the segment component generating segment profiles of at least one segment of the multi-media files, a segment profile for a segment being based, at least in part, upon responsibility vectors of the segment; and, a sort component that provides information associated with a likelihood that a particular multi-media file includes the multi-media query segment based, at least in part, upon the query profile and a segment profile of a segment of the particular multi-media file.

27. A computer-implemented multi-media responsibility vector generation system, comprising:

means for extracting subband signals from frames of files, the files comprising at least one of audio information and video information; means for extracting a features and forming a feature vector for at least some of the frames based, at least in part, upon features extracted from the subband signals;

means for clustering the files based, at least in part, upon vector quantization of the extracted features; and, means for generating a responsibility vector for at least some of the frames based, at least in part, upon responsibility of mixture components fitted to a mixture model for the frame.

28. A computer-implemented multi-media searching system, comprising:

means for calculating responsibility vectors for frames of a query segment;

means for calculating a query profile based, at least in part, upon the responsibility vectors of the frames;

means for retrieving responsibility vectors for segments of multi-media files;

means for generating segment profiles of at least one segment of the multi-media files, a segment profile for a segment being based, at least in part, upon responsibility vectors of the segment; and, means for providing information associated with a likelihood that a particular multi-media file includes the query segment based, at least in part, upon the query profile and a segment profile of a segment of the particular multi-media file.

* * * * *